United States Patent
Bell et al.

(10) Patent No.: US 9,723,145 B2
(45) Date of Patent: Aug. 1, 2017

(54) SYSTEM AND METHOD FOR ANALYSIS AND CORRELATION OF SCORING AND CUSTOMER SATISFACTION

(71) Applicant: Genesys Telecommunications Laboratories, Inc., Daly City, CA (US)

(72) Inventors: Cliff Bell, Kalispell, MT (US); Daniel Stoops, Powell, OH (US); Steve O'Donoghue, San Francisco, CA (US); Herbert Ristock, Walnut Creek, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 14/726,471

(22) Filed: May 30, 2015

(65) Prior Publication Data
US 2016/0352900 A1 Dec. 1, 2016

(51) Int. Cl.
| | |
|---|---|
| *H04M 3/00* | (2006.01) |
| *H04M 5/00* | (2006.01) |
| *H04M 3/51* | (2006.01) |
| *G06Q 10/06* | (2012.01) |

(52) U.S. Cl.
CPC .... *H04M 3/5175* (2013.01); *G06Q 10/06393* (2013.01); *G06Q 10/06398* (2013.01)

(58) Field of Classification Search
CPC .......... H04M 3/5232; H04M 2250/60; H04M 2203/408; H04M 3/2218; H04M 3/5175
USPC .............. 379/265.06, 265.05, 266.1, 265.03, 379/265.07, 265.08
See application file for complete search history.

(56) References Cited

U.S. PATENT DOCUMENTS

| | | | |
|---|---|---|---|
| 8,718,271 B2* | 5/2014 | Spottiswoode ..... | H04M 3/5232 379/265.02 |
| 9,288,326 B2* | 3/2016 | Chishti .............. | H04M 3/5232 |
| 2015/0178371 A1* | 6/2015 | Seth ........................ | H04L 67/10 707/748 |

* cited by examiner

*Primary Examiner* — Thjuan K Addy
(74) *Attorney, Agent, or Firm* — Lewis Roca Rothgerber Christie LLP (57) ABSTRACT

A system and method include a contact center to provide an interaction between a customer and agent. An analytics server connects with the contact center to parse a text of the interaction and determine an intent and a topic of the interaction based on the parsed text. The analytics server determines an implicit survey score for the interaction based on comparing the intent and the topic of the interaction with an intent and a topic of an interaction that was correlated with an explicit survey score.

22 Claims, 4 Drawing Sheets

SYSTEM AND METHOD FOR ANALYSIS AND CORRELATION OF SCORING AND CUSTOMER SATISFACTION

BACKGROUND

Contact centers can include offices set up to handle large volumes calls, emails, chats, text messages, letters, and other interactions with customers. The contact centers can screen interactions, forward the interactions to someone qualified to handle them, and to log the interactions. Contact centers can be used by mail-order catalog organizations, telemarketing companies, computer product help desks, and any large organization that uses the telephones, etc. to sell or service products and services to customers.

Net promoter score (NPS) is a tool that can be used to gauge the loyalty of a customer relationships. NPS is based on the question of how likely it is that the customer would recommend the company/product/service to a friend or colleague.

BRIEF DESCRIPTION OF THE DRAWINGS

In association with the following detailed description, reference is made to the accompanying drawings, where like numerals in different figures can refer to the same element.

DETAILED DESCRIPTION

A goal of companies and their respective contact centers can be to provide quality customer service and products. Customer service surveys, including but not limited to customer satisfaction (CSAT), net promoter scores (NPS), customer effort scores (CES), etc. can be important metrics for companies to track such quality. It can be a struggle, however, to obtain a number of customer replies to customer service surveys to gather enough data to determine the CSAT, NPS, CES, etc. scores, e.g., to represent a vast range of customers. A vast majority of customers may not respond to post-interaction surveys. As described herein, systems, methods and/or machine learning is used to predict and/or assign CSAT, NPS, CES, etc. scores for specified circumstances, e.g., un-replied surveys.

Figure 1:
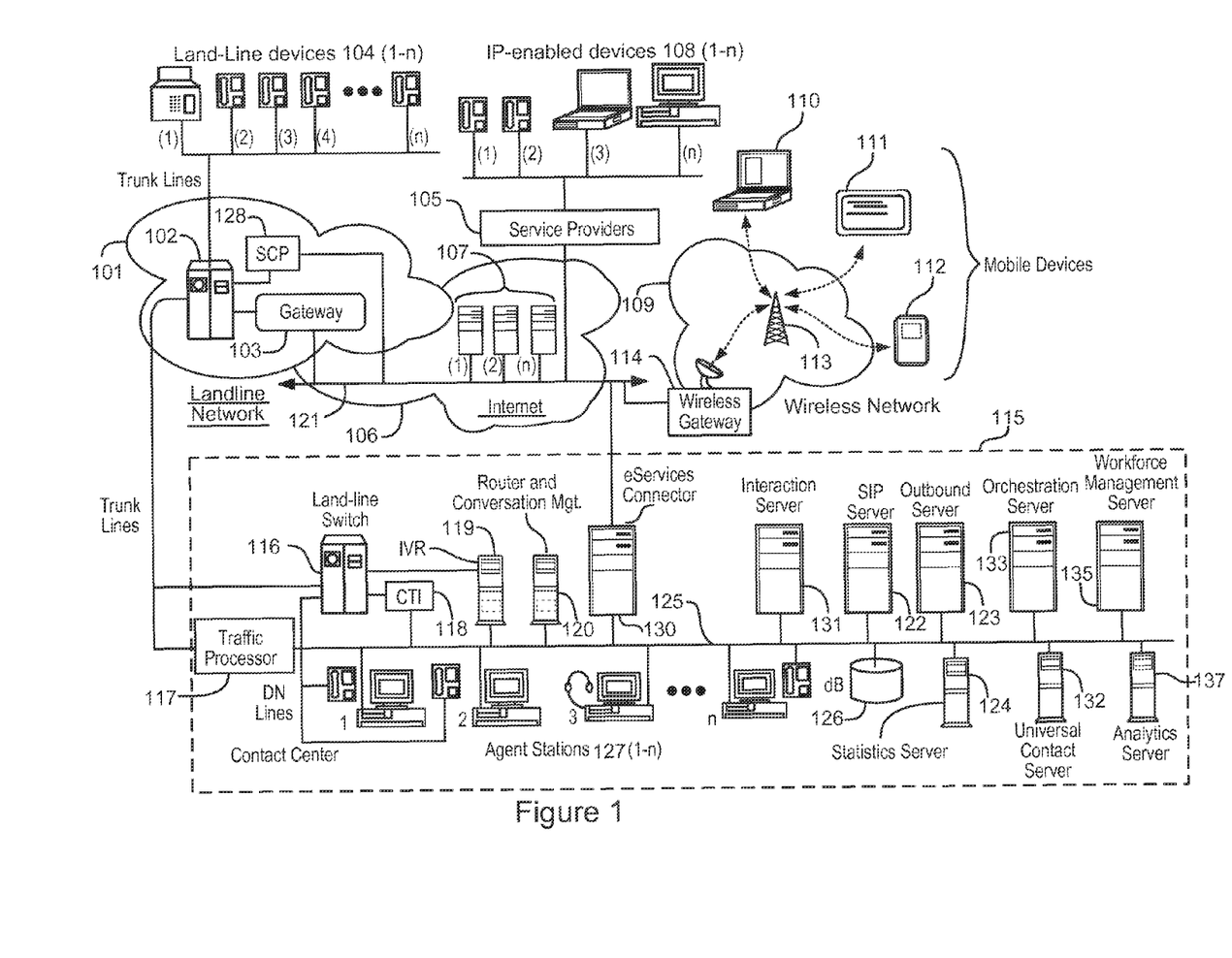
FIG. 1 is a block diagram of an example architectural overview of a contact center.

FIG. 1 is a block diagram illustrating a contact center 115 and a plurality of networks with interconnections where customers may interact with agents of the contact center. More or less of the modules discussed with the contact center 115 can be used, e.g., depending on an implementation. The modules can be located at the same physical location, at different physical locations, and/or virtually in a cloud, etc. The contact center 115 may be hosted by an enterprise and the enterprise may employ more than one contact center. Customers and agents may interact with contact center 115 through communication appliances such as land-line devices, e.g., telephones and facsimile machines 104(1-n), IP-enabled devices 108(1-n), e.g., laptop or desk-top computer and IP-enabled phones, through mobile devices 110, 111 or 112, e.g., mobile phones, smart phones, personal digital assistants, tablets, etc. Interactions may include voice, text messages, email, messaging services chat, facsimiles, mailed letters, and so on.

In one example of a contact center 115, interactions through land-line devices 104 may connect over trunk lines as shown to a network switch 102. Switch 102 may interact with hardware and software of a Service Control Point (SCP) 128, which may execute intelligent operations to determine to connect an incoming call to different ones of possible contact centers or to route an incoming call and facsimiles to an agent in a contact center or to an agent operating as a remote agent outside a contact center premises. Incoming calls and facsimiles in some circumstances may also be routed through a gateway 103 into the Internet network 106 as packet-switched calls. The interconnections in the Internet are represented by backbone 121. In this circumstance such a call may be further processed as a packet-switched IP call. Equipment providing SCP services may also connect to the Internet and may allow SCP functionality to be integrated with Internet-connected servers and intelligence at contact centers.

A call from a land-line device 104 connecting to switch 102 may be routed to contact center 115 via trunk lines as shown to either a land-line switch 116 in contact center 115 or to a Traffic Processor 117. A contact center 115 may operate with the land-line switch or the traffic processor, but in some circumstances may employ both incoming paths. Traffic processor 117 may provide Session Border Control (SBC) functionality, may operate as a Media Gateway, or as a Softswitch.

Interactions through IP-enabled devices 108(1-n) may occur through the Internet network via backbone 121, enabled by a variety of service providers 105 which operate to provide Internet service for such devices. Devices 102(1) and 102(2) may be IP-enabled telephones, operating under a protocol such as Session Initiation protocol (SIP). Appliance 108(3) is illustrated as a lap-top computer, which may be enabled by software for voice communication over packet networks such as the Internet, and may also interact in many other ways, depending on installed and operable software, such as Skype™ or other VoIP solutions based on technologies such as WebRTC. Similarly appliance 108(n) illustrated as a desktop computer, may interact over the Internet in much the same manner as laptop appliance 108(3).

Many IP-enabled devices provide capability for users to interact in voice interactions, video interaction, and text interactions, etc. such as speaking with an agent 127(1-n), video chatting with an agent 127(1-n), interacting by email and/or text messaging services and other protocols. Internet 106 may include a great variety of Internet-connected servers 107 and IP-enabled devices with Internet access may connect to individual ones of such servers to access services provided. Servers 107 in the Internet may include email servers, text messaging servers, social networking servers, Voice over IP servers (VoIP), and many more, many of which users may leverage in interaction with a contact center such as contact center 115.

Another arrangement to interact with contact centers is through mobile devices, illustrated in FIG. 1 by devices 110, 111 and 112. Such mobile devices may include, but are not limited to laptop computers, tablet devices and smart telephones. Such devices are not limited by a land-line connection or by a hard-wired Internet connection as shown for land-line devices 104 or IP-enabled devices 108, and may be used by customers and agents from changing geographic locations and while in motion. Devices 110, 111 and 112 are illustrated in FIG. 1 as connecting through a wireless network 109, which may occur in various ways, e.g., through Wi-Fi and/or individual ones of cell towers 113 associated with base stations having gateways such as gateway 114 illustrated, the gateways connected to Internet backbone 121, etc.

In some circumstances mobile devices such as devices 110, 111 and 112 may connect to supplemental equipment operable in a moving vehicle. For example, cellular smartphones may be enabled for near-field communication such as Bluetooth™, and may be paired with equipment in an automobile, which may in turn connect to the Internet network through satellite equipment and services, such as On-Star™. Wireless communication may be provided as well in aircraft, which may provide an on-board base station, which may connect wirelessly to the Internet through either a series of ground stations over which an aircraft may pass in flight, or through one or more satellites.

Regardless of the variety of ways that Internet access may be attained by mobile devices, users of these devices may leverage Internet-connected servers for a great variety of services, or may connect through the Internet more directly to a contact center such as contact center 115, where users may interact as customers or as agents of the contact center.

Contact center 115, as described above, may represent one of a plurality of federated contact centers, a single center hosted by a single enterprise, a single contact center operating on behalf of a plurality of host enterprises, or any one of a variety of other arrangements. Architecture of an individual contact center 115 may also vary considerably, and not all variations may be illustrated in a single diagram such as FIG. 1. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line devices 104, IP-enabled devices 108 or mobile devices represented by devices 110, 111 or 112. The CTI server 118 can be implemented with a GENESYS TELECOMMUNICATIONS SYSTEMS, INC. T-server. Calls may be queued in any one of a variety of ways before connection to an agent, either locally-based or remote from the contact center, depending on circumstances.

Incoming land-line calls to switch 116 may also be connected to the interactive voice response (IVR) server 119, which may serve to ascertain a purpose of the caller and other information useful in further routing of the call to final connection, if further routing is needed. The orchestration server 133 and a conversation manager server 120 may be leveraged for routing intelligence, of which there may be a great variety, and for association of the instant call with previous calls or future calls that might be made. The orchestration server 133 and conversation manager server 120 can be mapped to a GENESYS TELECOMMUNICATIONS SYSTEMS, INC. orchestration server, universal routing server (URS) and conversation manager. The IVR 119 can also be used during outbound call campaigns.

Land-line calls thusly treated may be connected to agents at agent stations 127(1) or 127(2), each of which is shown as including a land-line telephone connected to switch 116 by directory number (DN) lines. The customer and the agent 127(1-n) need not share the same type of mobile and landline connectivity. The customer may be using a mobile device and the agent 127(1-n) a landline device, or vice versa. Such calls may also be connected to remote agents using land-line telephones back through the land-line network. Such remote agents may also have computing appliances connected to contact center 115 for interaction with agent services such as scripting through an agent desktop application, also used by agents at agent stations 127(1-n).

Incoming calls from land-line network 101 may alternatively be connected in contact center 115 through Traffic Processor 117, described briefly above, to LAN 125. In some circumstances Traffic Processor 117 may convert incoming calls to SIP protocol, and such calls may be further managed by SIP Server 122.

Incoming calls from IP-enabled devices 108 or from mobile devices 110, 111 or 112, and a wide variety of text-based electronic communications may come to contact center 115 through the Internet, arriving in the Contact Center at an eServices Connector 130. eServices Connector 130 may provide protective functions, such as a firewall may provide in other architecture, and may serve to direct incoming transactions to appropriate service servers. For example, SIP calls may be directed to SIP Server 122, and text-based transactions may be directed to an Interaction Server 131, which may manage email, chat sessions, Short Message Service (SMS) transactions (via a voice signaling channel), co-browsing sessions, and more.

The Interaction Server 131 may leverage services of other servers in the contact center, and remotely as well. For example, SMS and email can be supported by a universal contact server 132 which interfaces with a database to store data on contacts, e.g., customers, including customer profiles and interaction history. The customer profile can include information about a level of service that the customer's interactions are to receive, e.g., for distinguishing a customer segment (gold/silver/bronze) a particular interaction belongs to. The orchestration server 133 is the session-based routing component that takes core capability of routing and extends it, generalizes it, and integrates it with other components.

A workforce management server 135 of the contact center 15 can help manage the agent stations 127(1-n) to ensure the right resources are in place at the right time to handle customer interactions and work items that the Interaction Server 131 sends to the agent stations 127(1-n), in an appropriate way. The orchestration server 133 can assign interactions and other work items to agents. The workforce management server 135 can schedule agents for activities, e.g., schedule an agent to process email on mortgages from 1-2 pm on Wednesdays. The workforce management server 135 helps ensure that agents that are skilled at handling the particular types of interaction (e.g., voice, email, chat, web, etc.) are available at the right times so that the enterprise can provide a good experience for the customers. The workforce management server 135 can provide for forecasting, scheduling and tracking to get the most from available agents, e.g., based on service level objectives, employee contracts and preferences.

An analytics server 137 of the contact center 15 can include one or more processors for interaction recording, e.g., between customers and agents, to perform speech analytics, text analytics, and/or chat analytics, etc., and quality management, etc. Additionally or alternatively, one or more analytics servers 137 may be used in conjunction or separately, e.g., one for text analytics, another for voice analytics (tone, agitation, etc.) and another for video (facial expressions), etc. The various analytics servers can have a "vote" for assessing customer satisfaction, including NPS.

The analytics server 137 can process the interactions to detect both intention, e.g., needs of the customer, and topics around those intentions, e.g., the topics 'money' and 'transfer' in the bank context. Other examples of intention include but are not limited to problems, questions, complaints, positive feedback, and others. In another example, the enterprise can have a dedicated #800 for various services. If the banking customer calls the #800 number for mortgages, for example, then the intent can be determined as 'mortgage.' Additionally or alternatively, the analytics server 137 can determine a sentiment of the interaction, for example, the customers view of or attitude toward the interaction, and/or feeling or emotion, e.g., if the customer sounds happy or angry and/or if the customer is using words that express satisfaction or displeasure. For example, a customer verbatim feedback includes "I have problems with you Tech Support process, because whenever I ask ANY question, they always respond asking for system logs to be extracted. Intention includes 'problem', sentiment includes negative, e.g., from the context of the text, emphasis on the word 'any', etc., and topics includes question and system logs."

Through machine learning and/or analysis, the analytics server 137 processes the speech, text message, chat, etc. to predict/assign an outcome of a customer satisfaction survey. One example of machine learning is the GENESYS CUSTOMER EXPERIENCE PLATFORM provided by GENESYS TELECOMMUNICATIONS SYSTEMS, INC. For example, for NPS the analytics server 137 uses the intention, topics, tags and sentiment to determine whether or not categorizations such as Net Promoter, Net Detractor, or Neutral elements of NPS may be applied to the specified interactions. Tags include categories that may be applied, either manually or systematically, to verbatim text. For example, a contact center analyst may create a tag called 'escalation' to note that they want the issue to be raised with someone senior. The analytics server 137 can screen for instances of the strings such as: escalate, supervisor, superior, 'person in charge'. When these strings are picked up, the 'escalation' tag is applied to the interaction. A difference between tags and topics is a tag includes custom entries created by the enterprise and topics are discovered by the analytics server 137, not created. Tags are usually the nouns associated with speech utterances, email, chat, and/or text messages in verbatim text. When an escalation tag is applied, along with a certain intention or sentiment, the tag can be an indicator of a negative NPS experience. For example, the tag may imply that the customer is a detractor.

As described in more detail below, the analytics server 137 can analyze explicit survey results, e.g., those results actually provided directly by customers, to determine patterns that exist between the text of customers' interaction and the explicit survey score provided, to decide survey results for those interactions in which the customer has not provided explicit feedback. Additionally or alternatively, the analytics server 137 can be used all the time, both when customer answers survey and when not, so that the predicted score can be compared with actual score, which allows to tune a logic of the analytics sever 137. Additionally or alternatively, the analytics server 137 can use speech, text message, chat, etc. analysis and machine learning to predict/assign a customer satisfaction percentage for CSAT for specified interactions. Additionally or alternatively, the analytics server 137 can analyze speech, text messages, chat, etc. and machine learning to predict/assign a customer's effort for CES for specified interactions. The analytics server 137 can be used to predict/assign other types of scores too.

When a user elects to apply categorizations of promoter, detractor and/or neutral to customer survey responses, the analytics server 137 can build-on or tune the scoring algorithm. For example, the contact center 15 reviews 500 of the interactions that were without a survey response. The contact center 15 applies the category detractor to 400 of these interaction and promoter to 100. Of the 400 detractors, 300 happen to contain an intention type of 'recommendation' and a topic around the recommendation of 'opening hours.' For example, the customer states, "I really think your opening hours should be longer on Friday." For machine learning, the intention and topic may not be purposefully tracked by the contact center 15. But the analytics system 137 can build the profile as the contact center 15 manually applies the category of detractor subjectively and presumably accurately. The profile can be applied by an agent 127(1-n), data analyst of the contact center, etc. A result is that the analytics server 15 can determine with a good deal of precision that when a response contains a 'recommendation' around 'opening hours' the customer is likely to be a detractor. A confidence level in the predicted score can be captured as a prediction attribute. In some implementations, predicted scores can be updated after each tuning of the logic of the analytics server 137 and/or a timestamp or tuning logic version can be attached to the predicted scores.

In one example of conducting customer-agent interactions which are part of the analyzed surveys, agent station 127(3) is illustrated as having a connected headset from a computing device, which may execute telephony software to interact with packet switched calls. Agent station 127(n) is illustrated as having an IP-enable telephone connected to LAN 125, through which an agent at that station may connect to packet-switched calls with the customers. The agent stations may have a computerized appliances executing software to enable the using agent to transact by voice, email, chat, text message, instant messaging, and any other communication process.

A statistics server 124 is illustrated in contact center 115, connected to LAN 125, and may provide a variety of services to agents 127(1-n) operating in the contact center 15, and in some circumstances to customers of the contact center 15. Statistics may be used in contact center management to vary functionality in routing intelligence, load management, and in many other ways. A database dB may be provided to archive interaction data and to provide storage for many of the activities in contact center 115. An outbound server 123 is illustrated and may be used to manage outbound calls in the contact center 115, where calls may be made to aid the authentication process, and answered calls may be connected directly or be queued to be connected to agents involved in the outbound calls.

As described above, contact center 115, and the architecture and connectivity of the networks through which transaction is accomplished between customers and agents is exemplary, and there are a variety of ways that similar functionality might be attained with somewhat different architecture. The architecture illustrated is exemplary.

Contact centers 115 may operate with a wide variety of media channels for interaction with customers who call, send text messages, send email, interact by chat, send mail, etc. to the contact centers 15. Such channels may enable voice interaction in some instances, and in other instances text-based interaction, which may include chat sessions, email exchanges, and text messaging, etc.

Figure 2:
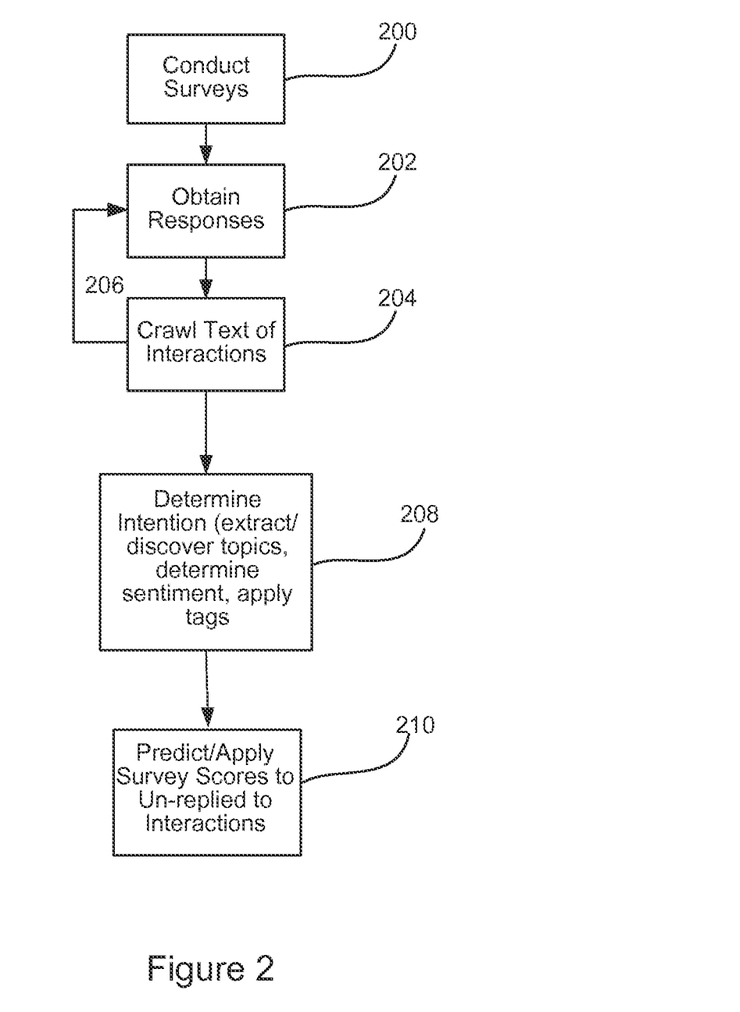
FIG. 2 is a flowchart of an example analysis and correlation of scoring to determine survey results.

FIG. 2 is a flowchart of an example analysis and correlation of scoring to determine survey results. For purposes of explanation, a banking context is used to describe one implementation of determining survey results. For example, a bank enterprise wishes to conduct customer transactional NPS surveys as part of their ongoing process regarding measuring customer satisfaction (200). The contact center 15 attempts to obtain responses to the surveys and the response rate to the surveys is 10% (202). The described values are examples and can vary depending on an implementation. The bank executives do not believe that volume of data in that 10% sampling is high enough to provide statistical relevance for their purposes. The bank may be nervous about basing decisions on the current data. Therefore, the contact center's 15 can use analytics and/or machine learning to determine NPS scores for the 90% of customers that have not replied to the customer survey. The determination can be based on analyzing the patterns in the text of the 10% of customers that did reply to the customer surveys.

First, the analytics server 137 can crawl the text of the interactions which are part of the 10% survey responded to, e.g., tens of thousands of responded to surveys (204). To make the text available to the analytics server 137, the orchestration server 133 can control storing the text in conversation management server 120 and/or universal contact server 132. In other example, speech is converted to text before being stored in the conversation management server 120 and/or universal contact server 132. The analytics server 137 can consider indicators alternative to or in addition to text, including video, e.g., facial expression, or voice, e.g., agitation, tone, for correlation. The analytics server 137 can also use the other indicators to adjust confidence of correctness of text analysis based assessment.

Some examples of the content in the 10% of the explicit interactions can include: a) 'I want a new Credit Card.' b) 'I need another credit card.' c) 'My wife is looking to get another card, for traveling abroad,' d) 'If only I could get one more credit card.' As the contact center 15 obtains new responses to the surveys (206), the analytics server 137 can re-crawl the text (204). In the context of these utterances, the analytics server 137 determines the intention type 'need' with a topic of 'credit card', and possible other factors including extracting/discovering the topics, determining sentiment and applying tags (208). In one example, the analytics server 137 identifies through machine learning a high preponderance of positive net promoters' results in interactions that contained an intention of 'need' along with a topic of 'credit card'. The analytics server 137 can use the analyzed data obtained from the crawling and analysis to apply similar NPS scores to similar un-replied to interactions, e.g., interactions in which the intention 'need' and the topic 'credit card' were used. Additionally or alternatively, sentiment can be used as part of the analysis. The analytics server 137 can use other variables, e.g., other intention types, topics, sentiments, etc. as part of the statistical analysis of the interaction data.

Figure 3:
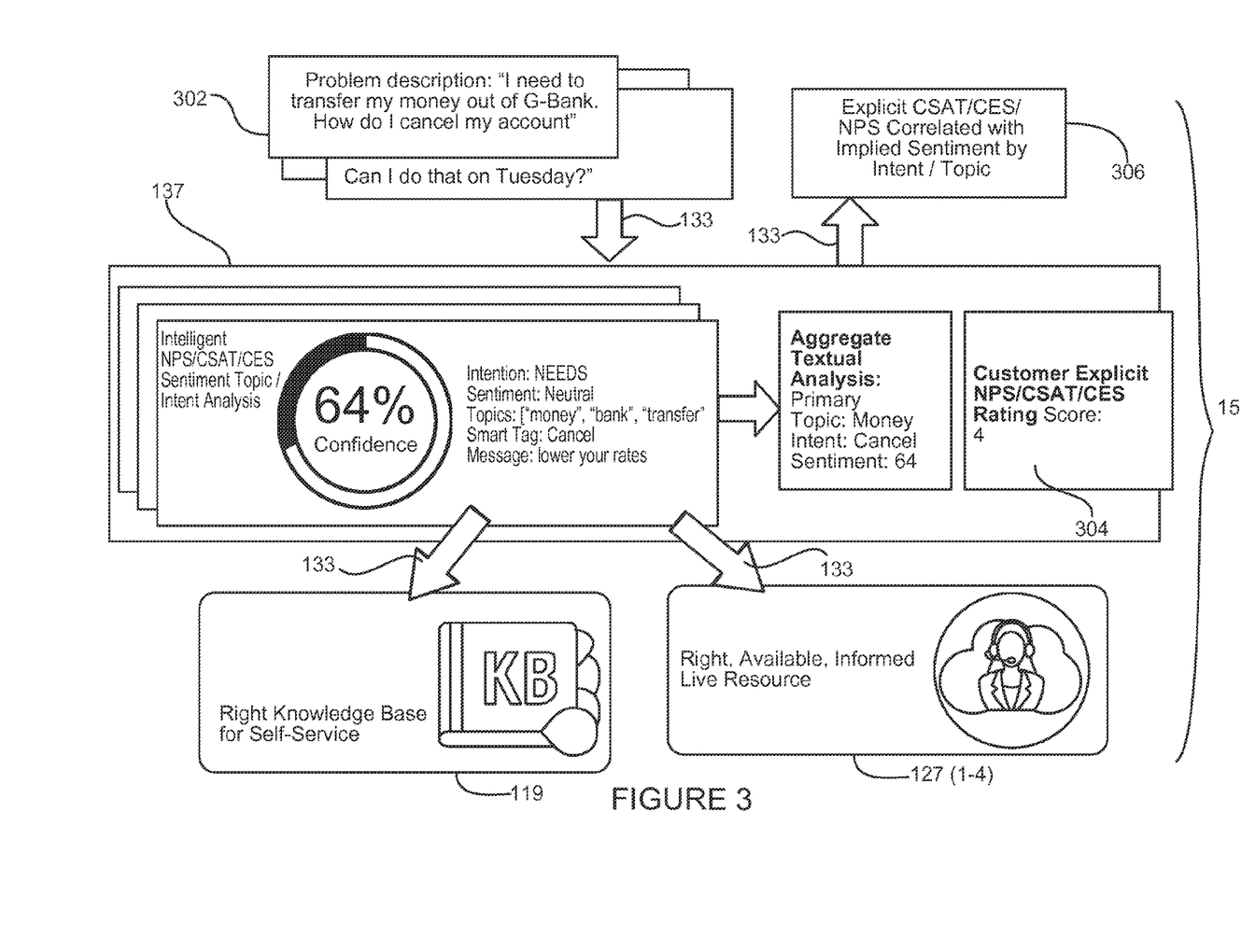
FIG. 3 is a block diagram of an example flow for an interaction between a customer and the agent.

FIG. 3 is a block diagram of an example flow for an interaction between a customer 302 and the agent 127(1-n). The customer 302 contacts the contact center 15 with a question or an issue, etc. In the banking example the customer 302 may wish to transfer money and/or close an account. The customer 302 can interact with the correct knowledge base for self-service, e.g., using IVR 119, and/or interact with the available agent 127(1-n) that is informed about the subject that the customer 302 is asking about. The orchestration server 133 routes the interaction to the correct agent 127(1-n). For some interactions the analytics server 137 parses the interaction to determine intention, e.g., customer needs, determine sentiment e.g., neutral, positive, negative, or a scored sentiment, and determine topics, e.g., money, bank, transfer. The analytics server 137 can tag certain key phrases, e.g., that the customer is 'cancelling' their account, and track messages to the customer, e.g., a message about lowering rates. The customer 302 can provide an explicit score to a survey, e.g., during and/or after the interaction completes. In other cases, the customer may have selected "cancel account" as a requested service in the IVR 119. In that case the analytics server 137 need not parse the text. If the contact center 15 connects the customer to an agent 127(1-n) then the customer can explain the requested service to the agent 127(1-n). In both the IVR 119 and agent 127(1-n) scenarios the "service type" can be attached to the interaction record as attribute. Therefore, the intention analytics can go beyond the coarse-grain service type classification. The orchestration server 133 can store the interaction and corresponding survey results with the conversation management server 120 and/or universal contact server 132.

The analytics server 137 performs analytics for the interaction based on text from a recorded call, a chat, a text message, etc. between an agent and a customer. The analytics server 137 can associate, subsequently or retroactively, the explicit score provided for the customer survey 304 for the interaction with interactions in which the text was analyzed in a similar way, e.g. using machine learning. Therefore, the analytics server 137 can associate and/or correlate the explicit survey score to the interaction to determine an implicit score 306 for the subsequent interactions. The survey type can include NPS, CSAT, CES, etc. The analytics server 137 can then provide a score for the un-replied surveys based on the known scores for the similar interaction.

Additionally or alternatively, the analytics server 137 can consider attributes about an identity of the customer when determining implicit survey responses for interactions from previous/other explicit responses. Customer attributes include age, gender, location, occupation, etc. The analytics server 137 can also use information about past contact center 15 interactions with the customer, e.g., a call history of the customer, the average length of interactions, etc. The analytics server 137 can also use intention plus topics and/or sentiment of the interaction to assign survey scores, e.g., based on the text the customer is using, sentence structure, customer responses to agent, etc. The interactions include the customer discussing a problem, making requests, etc.

The analytics server 137 can also compare other factors of interactions having explicit survey scores and subsequent interactions, including using the journey of the interactions through the IVR 119 to agent 127(1-n) etc. to determine the implicit survey scores for the subsequent interactions. For example, the analytics server 137 can consider the options chosen by the customer when interacting with the IVR 119. The analytics server 137 can also compare purchase histories, how many time the customers have returned goods, etc. These features considered by the analytics server 137 can also be weighted. For example, the customer's journey via the IVR 119 is weighted at x percent and the customer attributes are weighted at y percent, etc. Additionally or alternatively, the number of channels that a customer crosses during the journey can obtain a high correlation factor to the survey score, the way that the customer describes their problem can obtain a low correlation to the survey score, and a number of times that the customer interacts with the contact center 15 for the same problem can obtain high indicator of the survey score, as determined by the analytics server 137.

Figure 4:
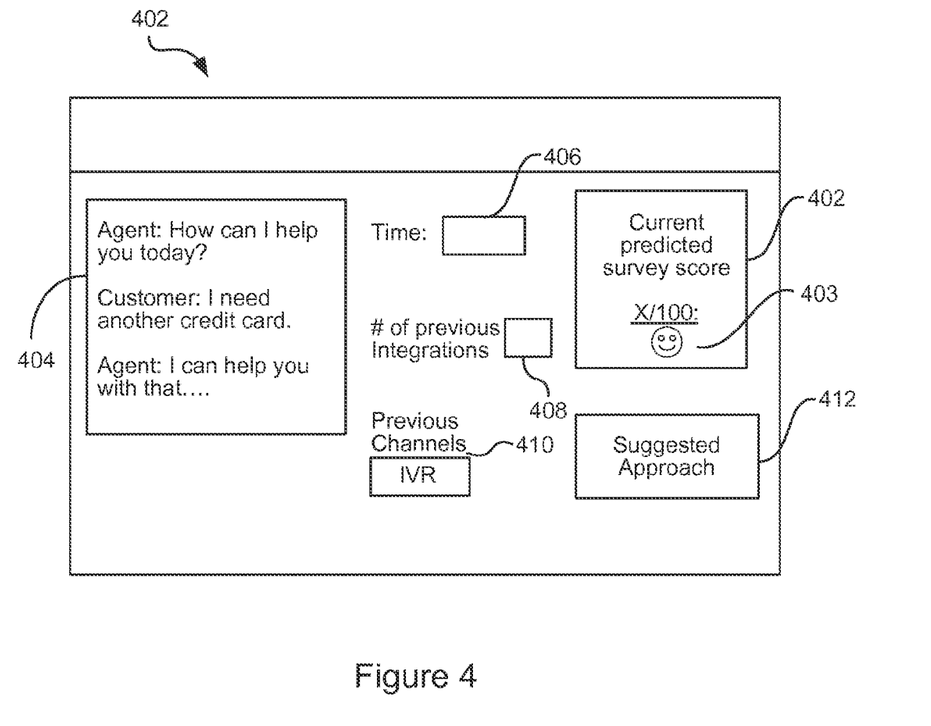
FIG. 4 is an example screen for displaying a current projected survey score to the agent.

FIG. 4 is an example screen 400 for displaying a current projected survey score 402 to the agent 127(1-n). The screen 400 can include a window 404 to display the chat text of the interaction with the customer to the agent 127(1-n). The agent 127(1-n) can also view the current predicted survey score 402, either as a number, or icon 403, e.g., smiley/sad face, etc. The agent 127(1-n) can act based on the projected survey score 402, e.g., to try to better satisfy the customer, present other services or products to the customer based on a positive/negative score, etc. The screen 400 can display suggestions 412 on how to tune the interaction for improving the predicted/assigned survey score 402 and what to avoid during the interaction with the customer. The suggestion 412 can be personalized based on a general profile for the interaction and/or based on the individual customer characteristics. The screen 400 can also display an elapsed time 406 of the interaction, a number 408 of previous or other interactions, and/or the previous or other channels 410 that the customer took to reach the agent 127(1-n), to aid in displaying the customer experience to the agent 127(1-n) to help improve the interaction with the customer.

If the contact center 15 is a separate entity from the enterprise, the contact center 15 can share the scores with the enterprise to use the explicit survey scores 304 along with the implicit survey scores 306 to make business decisions and try to provide better customer service than is provided without the scores. This implicit survey scores can provide the enterprise richer feedback than the explicit survey scores alone, e.g., all interactions with the organization can be analyzed, rather than only the interactions in which a customer chooses to take a survey. In addition, the assigned survey scores can be used to decide when to reach out to customers that otherwise may be left unidentified, as most customers do not complete post call surveys. For example, for an explicit negative NPS score a manager can immediately follows up with the given customer. The same may be done for an implicit NPS score, e.g., if a confidence level is above certain threshold. If there is a follow-up based on an implicit NPS score, the outcome can be incorporated as feedback loop for tuning the logic of the analytics server 137, for example, if the predicted implicit NPS score was low but during follow-up it turned out to be actually high.

Additionally or alternatively, the analytics server 137 can provide the predicted score to the customer 302, to illustrate to the customer 302 how the enterprise believes that the customer is feeling, e.g., in the form of a smiley face or sad face. The customer can be presented with an option to confirm or correct the predicted score. This could help show that the enterprise knows how the customer feels, e.g., empathizes with the customer, and the enterprise can act to try to improve those feelings if the feeling are negative. Additionally or alternatively, use of the implicit score does not detract from the customer experience and does not require additional time by the customer or additional agent 127(1-n) resources of the enterprise to capture. With the implicit scores, particularly for topics that tend to produce strong promoters and detractors, fewer customers need to be explicitly asked about their customer experience, as analysis of sentiment, topic and intent by the analytics server 137 can provide very similar feedback to the organization about the propensity of an individual customer to be a promoter or detractor of the company, etc. Another advantage can include improved customer experience because customers are not being asking constantly to take a survey or answer a final question following their customer service interaction. In addition, the contact center can use the analysis of topic, intent and sentiment as a training tool to inform additional training for agents 127(1-n). Based on the implicit survey scores, corrective measures can be taken at the contact center 15, e.g. to avoid scenarios causing negative scores and strengthen those actions that lead to positive scores. Related agent 127(1-n) sensitivity analysis can be part of the machine learning process, which may be more granular than CES. For each particular enterprise there can be further influential parameters.

The contact center 15 and accompanying systems may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

The systems and methods described above may be implemented in many different ways in many different combinations of hardware, software, firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The systems and methods can also include a display device, an audio output and a controller, such as a keyboard, mouse, trackball, game controller, microphone, voice-recognition device, or any other device that inputs information. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. The systems and methods can be implemented over a cloud.

While various embodiments have been described, it can be apparent that many more embodiments and implementations are possible. Accordingly, the embodiments are not to be restricted.

The invention claimed is:

1. A system comprising:
an analytics server associated with a customer contact center, the analytics server being configured to:
identify an interaction between a customer and an agent;
parse a text of the interaction;
determine an intent and a topic of the interaction based on the parsed text;
compare the intent and the topic of the interaction with an intent and a topic of a second interaction, wherein the intent and the topic of the second interaction are stored in a data storage device in correlation with an explicit survey score;
determine an implicit survey score for the interaction based on the comparing and the explicit survey score; and
generate an output based on the determined implicit survey score.

2. The system of claim 1, where the analytics server further determines the implicit survey score based on attributes about an identity of the customer.

3. The system of claim 1, where the analytics server further determines the implicit survey score based on a call history of the customer.

4. The system of claim 1, where the analytics server further determines the implicit survey score based on a journey through the contact center.

5. The system of claim 1, where the analytics server displays the implicit survey score to an agent during the interaction.

6. The system of claim 1, where the analytics server applies a weight to at least one of the intent and the topic.

7. The system of claim 1, where the interaction comprises at least one of a recorded call, a chat and a text message.

8. The system of claim 1, where the explicit survey score comprises at least one of customer satisfaction, net promoter score, or customer effort score.

9. The system of claim 1, where the analytics server further determines a sentiment of the interaction and further determines the implicit survey score based on the sentiment.

10. A method, comprising:
storing, by a processor, a text of an interaction in a memory;
parsing, by the processor, the text of the interaction between a customer and an agent;
determining, by the processor, an intent and a topic of the interaction based on the parsed text;
comparing, by the processor, the intent and the topic of the interaction with an intent and a topic of a second interaction wherein the intent and the topic of the second interaction are stored in a data storage device in correlation with an explicit survey score;
determining, by the processor, an implicit survey score for the interaction based on the comparing and the explicit survey score;
generating, by the processor, an output based on the determined implicit survey score.

11. The method of claim 10, further comprising providing agent training based on the implicit survey score.

12. The method of claim 10, further comprising determining the implicit survey score based on attributes about an identity of the customer.

13. The method of claim 10, further comprising determining the implicit survey score based on a call history of the customer.

14. The method of claim 10, further comprising determining the implicit survey score based on a journey through a contact center.

15. The method of claim 10, further comprising displaying the implicit survey score to an agent during the interaction.

16. The method of claim 10, further comprising applying a weight to at least one of the intent and the topic.

17. The method of claim 10, where the interaction comprises at least one of a recorded call, a chat and a text message.

18. The method of claim 10, where the explicit survey score comprises at least one of customer satisfaction, net promoter score, or customer effort score.

19. The method of claim 10, further comprising determining a sentiment of the interaction and further determines the implicit survey score based on the sentiment.

20. The method of claim 10, further comprising displaying the implicit survey score to the customer.

21. The system of claim 1, wherein the second interaction is with a second customer, and wherein the explicit survey score is provided by the second customer based on the second interaction.

22. The method of claim 10, wherein the second interaction is with a second customer, and wherein the explicit survey score is provided by the second customer based on the second interaction.

* * * * *